United States Patent
Brogårdh et al.

(10) Patent No.: US 7,011,489 B2
(45) Date of Patent: Mar. 14, 2006

(54) INDUSTRIAL ROBOT

(75) Inventors: Torgny Brogårdh, Västerås (SE);
Daniel Wäppling, Västerås (SE); Feng Xialong, Västerås (SE); Bo Holmgren, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/466,348

(22) PCT Filed: Jan. 15, 2002

(86) PCT No.: PCT/SE02/00074

§ 371 (c)(1),
(2), (4) Date: Oct. 31, 2003

(87) PCT Pub. No.: WO02/058895

PCT Pub. Date: Aug. 1, 2002

(65) Prior Publication Data

US 2004/0103739 A1 Jun. 3, 2004

(30) Foreign Application Priority Data

Jan. 15, 2001 (SE) .................................. 0100134

(51) Int. Cl.
*B25J 17/02* (2006.01)

(52) U.S. Cl. .................... 414/735; 74/490.06; 414/917; 901/15; 901/28

(58) Field of Classification Search ................ 414/735, 414/917, 729; 74/490.01, 490.05, 490.06, 74/490.07; 901/15, 28
See application file for complete search history.

(56) References Cited

U.S. PATENT DOCUMENTS

| | | |
|---|---|---|
| 5,156,062 A | 10/1992 | Appleberry |
| 5,219,266 A | 6/1993 | Reboulet et al. |
| 5,539,291 A | 7/1996 | Reboulet |
| 5,847,528 A | 12/1998 | Hui et al. |

FOREIGN PATENT DOCUMENTS

| | | |
|---|---|---|
| FR | 2739801 | 4/1997 |
| JP | 09-186216 | 7/1997 |
| WO | 98/30366 | 7/1998 |
| WO | 99/14018 | 3/1999 |
| WO | 99/58301 | 11/1999 |

*Primary Examiner*—Donald W. Underwood
(74) *Attorney, Agent, or Firm*—Venable LLP; Eric J. Franklin

(57) ABSTRACT

An industrial robot for movement of an object in space comprising a stationary platform, a movable platform adapted for supporting the object, and a first, a second and a third arm to which the platforms are joined. The first arm comprises a first actuator, a first supporting arm influenced by the first actuator and rotatable around a first axis, and a first linkage. The second arm comprises a second actuator, a second supporting arm influenced by the second actuator and rotatable around a second axis, and a second linkage. The third arm comprises a third actuator, a third supporting arm influenced by the third actuator and rotatable around a third axis, and a third linkage. The second supporting arm is freely mounted around a cross-beam that is arranged at right angles to the second axis.

14 Claims, 9 Drawing Sheets

INDUSTRIAL ROBOT

TECHNICAL FIELD

The present invention relates to an industrial robot comprising a manipulator and control equipment where the manipulator has three arms, each arm having a linkage supporting a movable platform. The control equipment comprises drives and means including a microprocessor and software for driving and guiding the manipulator in the desired manner. To achieve the desired movement of the platform, the linkages comprise links or rods that are articulately connected between the platform and the arms. Each joint allows a movement in three degrees of freedom. The arms are fixed to stationary actuators that allow a movement in one degree of freedom. This movement comprises both rotation and translation. The task of the platform is to directly or indirectly support tools or objects for movement, measurement, processing, machining, joining, etc.

BACKGROUND ART

For movement and rotation of objects without changing the inclination of the objects, so-called SCARA-type robots are primarily used today. These robots are designed for the four degrees of freedom, x, y, z and rotation of an object around the z-axis. For manipulation of the object in the xy-plane, two series-connected arms are used that operate in the xy-plane, the axes thus being perpendicular to the xy-plane. The fact that the arms are connected in series implies that one arm supports the other arm, which in turn supports the object. To obtain a movement in the z-direction, a linear movement device is used. This device may be located either after the series-connected arms or before the series-connected arms in the serial kinematic chain of the robot. In the former case, the series-connected arms must move the drive package for the z-movement and in the latter case the drive package for the z-movement must move the series-connected arms. The drive package for rotating the object around the z-axis will always be located furthest out in the kinematic chain of the robot.

The series connection of the arms of the SCARA robot, as well as in other robots with series-connected links, implies that the robot is given a large movable mass, that the robot structure is weak, that the accuracy is limited and that large motor torques are required to make fast movements.

Several of the drawbacks that are associated with the SCARA robot are overcome by a robot that manipulates a platform with three parallel-working arms. This is referred to as a parallel kinematic structure. To obtain a rigid arm system with a large loading capacity and a low weight, the outer arms of the parallel-kinematic manipulator, nearest the manipulated platform, shall consist of six links in total, which only transfer compressive and tensile forces. A manipulator for movement of a platform in space is previously known, where the platform has the same inclination and orientation in its entire working range. The known robot has three parallel-working arms, each having its own linkage. It is known in this context that the total number of links is six and that they may be optionally distributed on the arms according to the combinations 2/2/2 or 3/2/1.

To more readily describe parallel-kinematic robots comprising linkages, some definitions of different linkages are introduced here:

Link: A link is a member that movably joins two elements and that, at each end, allows movement in three degrees of freedom. It usually consists of a rigid elongated member such as, for example, a rod that has a ball joint at each end. The link holds the elements at a definite distance from each other and absorbs only tensile or compressive forces. Thus, a link transfers no torsional movements.

Double link: A double link is a member that movably joins two elements, that at each end allows movement in three degrees of freedom, and that transfers a moment in a plane between the elements. The double link consists of a quadrangle with, for example, two links, according to the above, that form a first pair of links and the elements that form the second pair of links. In a special case, the double link is a parallelogram, in which case the two elements are forced to move in parallel with each other. Since all joints allow movement in three degrees of freedom, this implies that the double link may twisted. Thus, the double link needs help from other linkages to remain plane.

Locked double link: A locked double link is a member that movably joins two elements that, at each end, allows movement in two degrees of freedom. The locked double link consists of a double link according to the above, wherein at least one diagonal is locked. This is achieved, for example, by introducing in the quadrangle an additional link that is not parallel to any of the other links. This prevents the elements from being displaced, but still the locked double link may be twisted.

Triple link: A triple link is a member that movably joins two elements, that at each end allows movement in three degrees of freedom, and that transfers a moment in two planes between the elements. The triple link usually consists of two double links, oriented in different planes, with one common link. In a special case, the triple link comprises a space parallelogram consisting of three parallel links of equal length. Such a space parallelogram may be twisted but maintains the elements oriented in parallel planes.

Triangle: A triangle is a member that movably joins two elements and that at one end (the base) allows movement in one degree of freedom and at its other end allows movement in three degrees of freedom. The triangle consists, for example, of a torsionally rigid member that, at its base, is journalled to a first element through an axis and at its other end is journalled to a second element by means of a ball joint. A triangle may also consist of two links according to the above, where one of the joints is common.

In the following text, an arm for a robot shall mean a linkage supported by a supporting arm. By the concept supporting arm is to be understood a torsionally rigid member that movably joins two elements together and that, at both ends, allow movement in one degree of freedom. The supporting arm consists, for example, of a tube with a fork arranged at each end through which an axle passes. In a special case, the axles are parallel whereby the elements joined by the supporting arm are allowed movement in one plane only. It should be mentioned that the movement comprises rotation as well as translation. The supporting arm may, from one element to the other, transfer both tensile and compressive forces, torsional moment and bending moment.

With the linkages defined above, the first of the known systems may be defined as a manipulator with three arms, each one consisting of a supporting arm and a double link. The second known manipulator may be defined as a manipulator with three arms wherein the first arm consists of a supporting arm and a link, the second arm of a supporting arm and a double link, and the third arm of a supporting arm and a triple link. It should be pointed out here that when designing according to the configuration 2/2/2, the axles of the supporting arms must cross each other to obtain an unambiguous orientation of the movable element.

For a fully extended parallel-kinematic robot for movement of a platform with three degrees of freedom (e.g. in directions x, y and z in a Cartesian system of coordinates), three parallel-working arms are required. If all six degrees of freedom of the platform (x, y, z and the tool orientation) are to be manipulated, six parallel-working arms are required. Each such arm comprises an upper arm and a lower arm. In several applications, a manipulation with a combination of degrees of freedom for positioning and degrees of freedom for orientation is desired. One class of such applications is interior work in narrow spaces. In that case, it is often desired to have a robot with two degrees of freedom for tool orientation and only one degree of freedom for radial positioning.

From U.S. Pat. No. 5,539,291, a parallel kinematic manipulator is previously known. A centre pillar supports a supporting arm operable around two axes. This supporting arm supports, in turn, a second supporting arm that supports a movable element. A first and a third supporting arm journalled about the same axis are connected to the movable element by means of outer arms comprising wires that, with respect to their function, may be likened to a combination of a supporting arm and a double link. The outer arms, as well as the second supporting arm, are arranged to transmit tensile and compressive forces as well as torsional moments. This entails a clumsy design of the manipulator. From the point of view of smoothness and the like, this manipulator cannot compare favourably with a corresponding manipulator where the outer arms only absorb tensile and compressive forces.

From WO98/30366, a parallel kinematic manipulator is previously known. Three arms including linkages here join together a stationary element and a movable element. Three actuators fixed to the stationary element each operate an arm. A first arm includes a supporting arm with a triple link. A second arm includes a supporting arm and a double link. A third arm includes a supporting arm and a link. The links included in these linkages only need to transmit compressive and tensile stresses, which makes them very rigid, although they are designed with small dimensions and of a light material. In addition, the joints are only subjected to a normal force from the links and the bearings may therefore be made light, stiff and accurate.

From WO99/58301, a further parallel kinematic manipulator is previously known. Also here, three arms including linkages join together a stationary element and a movable element. Three actuators fixed to the stationary element each operate an arm. All arms include a supporting arm with a double link, wherein the arms transmit compressive and tensile stresses only. This arm structure has been made possible by designing the manipulated platform as a frame structure in three dimensions instead of a platform in the form of a plane structure in two dimensions, as in the above known manipulator (WO98/30366).

Both in the case of a two-dimensional and in the case of a three-dimensional manipulated platform according to the above-referred known manipulators, the problem arises that the arm that provides the movement of the robot in the vertical direction (in the z-direction) is influenced by large forces. In the case of large movements of the other arms (in the xy-plane), this arm will be influenced not only by torsional moments but also by strong bending moments. Especially unfavourable are forces that, in the outer end of the arm, act in an axial direction. The design implies that, when the robot is extended, said arm in the vertical direction will be located obliquely between the other two arms, as well as when the robot is folded together. Because of the kinematics, said arm for the z-manipulation will be located midway between the other two arms only within a narrow radial distance from the centre of the robot. This entails the following disadvantages:

The working range is limited by the fact that the arm for z-manipulation is given an unfavourable position relative to the other arms.

The rigidity of the robot will be limited by the fact that the arm for z-manipulation places at least one articulated rod in an unfavourable direction relative to the manipulated platform.

The accuracy of the robot will be limited by the extra kinematic non-linearity created by the arm for z-manipulation.

The dynamic properties and the rapidity of the robot are limited by the fact that the arm for z-manipulation is subjected to oblique dynamic forces.

The kinematics of the robot does not automatically provide radial movement planes but a complicated mathematical compensation must be made in the control system for the curvature caused by the arm for z-manipulation.

SUMMARY OF THE INVENTION

The object of the present invention is to suggest ways and means of producing a parallel-kinematic robot that exhibits a large working range and that prevents the arms of the robot from being subjected to unfavourable forces. This is achieved by an industrial robot with a manipulator comprising a stationary element, a movable element and three arms interconnecting the elements, each arm having a supporting arm and a linkage supported by the supporting arm, the movement plane of a central arm being adapted to intersect the movable element upon all movements.

From a first aspect of the invention, the manipulator comprises a linkage that allows the movable element a movement in space, where the orientation of the element is all the time the same irrespective of position. From a second aspect of the invention, the manipulator comprises a linkage that allows the movable element a movement along a conceived cylinder where the radius is varied. From a third aspect of the invention, the manipulator comprises a linkage that allows the movable element a movement along a spheroid where the radius is varied.

The manipulator, which is common from all aspects, comprises a first supporting arm, a second supporting arm, and a third supporting arm. The second supporting arm will be referred to below also as the central supporting arm. Besides being journalled about a first axis, around which the drive system is arranged, this central supporting arm is also freely journalled about a second axis arranged substantially in a normal plane to the drive shaft. The method for imparting to the central arm only small transverse forces comprises adapting the central arm, by connections to the other arms, to adopt a position in between these.

In a first preferred embodiment, the manipulator comprises an additional supporting arm, which is journalled at the central supporting arm. The end of this additional supporting arm is joined by a first link to the first supporting arm and by a third link to the third supporting arm. In a further preferred embodiment, the additional arm comprises a triangle journalled with the base to the central supporting arm. In an additional preferred embodiment, the central supporting arm comprises a rod that is fixed to the arm and on which a sleeve is running. The rod is joined to the first and third supporting arms, respectively, by a first and third link. It should also be mentioned that the further supporting arm, the triangle or the rod may equally be arranged both between the two elements and behind the stationary element.

In a further preferred embodiment, the manipulator comprises a triangle, the base of which is journalled at the outer end of the central supporting arm and the top of which is journalled to the movable element. This embodiment presupposes that the linkages, which is supported by the other two supporting arms, comprise a double link and a triple link. In this embodiment, transverse forces are thereby allowed to influence the central arm. Since the central supporting arm is freely journalled in the direction of the transverse force, these forces will be moderate. In a special case, the movable element of the manipulator is formed elongated, all the link attachments thus being arranged on a straight line. The manipulator thus shaped is operated with five links only.

To lock all of the six degrees of freedom of the manipulated platform, a total of at least six (in a special case five) articulated rods are used. In this way, each articulated rod will only have to transmit tensile and compressive forces, which allow the articulated rods to be made very rigid, light and accurate. Articulated rods mounted on the same supporting arm, in those cases in which they are more than one, are mounted in parallel with one another and are made equally long.

The industrial robot according to the invention also comprises a control unit that handles the movements of the manipulator. The control unit comprises drives for each of the arms, power transmission, etc., and comprises a plurality of microprocessors, which are brought to operate the manipulator by means of instructions from a computer program.

BRIEF DESCRIPTION OF THE DRAWING

The invention will be explained in greater detail by means of embodiments with reference to the accompanying drawing wherein.

DESCRIPTION OF THE PREFERRED EMBODIMENT

Figure 1:
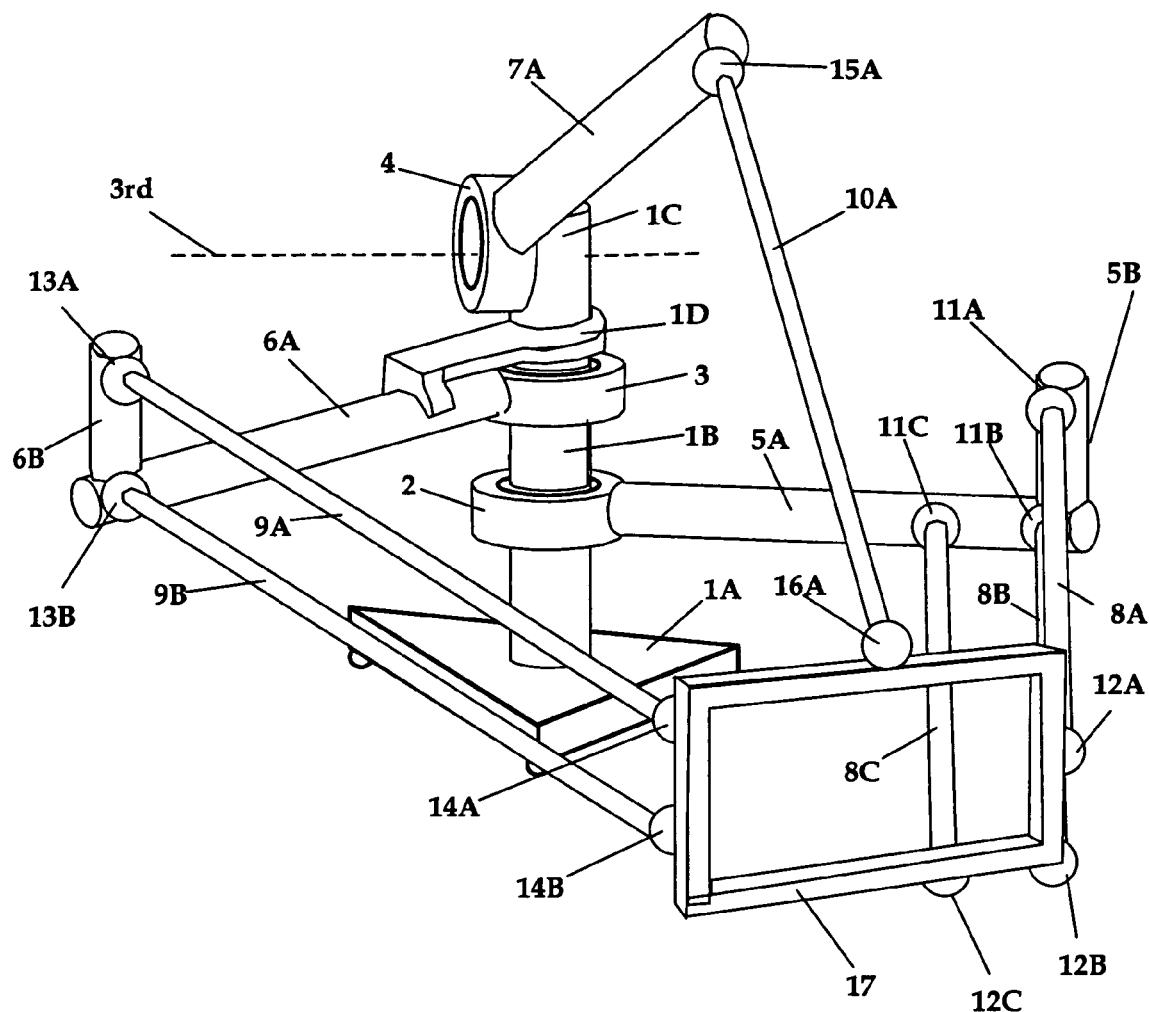
FIG. 1 shows a known parallel-kinematic robot in which an actuator is mounted on an arm that is turned around by another manipulator and the working range and dynamic and static performance of which are therefore considerably limited.

FIG. 1 shows a parallel-kinematic robot, which is a development of the known structures disclosed in, inter alia, U.S. Pat. No. 5,539,291. The robot is mounted on a foot 1A, on which a column 1B is secured. On this column there is arranged a first actuator 2 that pivots a first supporting arm 5 around a first axis, and a second actuator 3 that pivots a second supporting arm 6A around a second axis. Both axis are parallel to each other, whereby the two supporting arms are each pivoting in respective horizontal planes shown in the figure. The actuators 2 and 3 are of the rotary type with coinciding vertical axes of rotation. On the arm 6A, an element 1C is secured by means of a holder 1D, and on this element a third actuator 4 is mounted. This causes the actuator 4 to be rotated by the actuator 3 around the vertical axis of rotation of the actuator 3. The third actuator 4 pivots a third supporting arm 7A in a vertical plane shown in the figure. The third axis is thus oriented substantially across the other two axes. When the actuator 3 pivots the arm 6A, the arm 7A will thus accompany the movement of the arm 6A and the angle between the projection of the arm 7A (in a horizontal plane extending through the arm 6A) and the arm 6A will be constant.

On the arm 5A, an articulated-rod arrangement consisting of three articulated rods 8A, 8B and 8C in a triangular configuration is mounted with the aid of joints 11$a$, 11B and 11C, respectively. At their other ends, the articulated rods 8A, 8B and 8C are mounted with the aid of the joints 12A, 12B and 12C, respectively, on the platform 17 that is to be manipulated by the robot. The articulated rods 8A, 8B and 8C have equal lengths and are mounted in parallel. This arrangement forms a triple link. The platform 17 is maintained parallel to the surface that is put up by the arm 5A and the vertical rod 5B, which is fixedly mounted on the arm 5A.

On the arm 6A, the vertical rod 6B is mounted in a corresponding manner, and the arm 6A is connected to the platform 17 via the articulated-rod arrangement consisting of the articulated rods 9A and 9B. The articulated rods 9A and 9B are at one of their ends connected to the arm 6A and the rod 6B through the joints 13A and 13B, respectively, and at their other end connected to the platform 17 through the joints 14A and 14B. The articulated rods 9A and 9B are mutually parallel and have equal lengths. This arrangement forms a double link. The platform 17 is maintained parallel to the rod 13A. In this embodiment, the articulated-rod arrangement between the third supporting arm 7A and the platform 17 consists of only one link 10A, which is articulately connected to the arm 7A through the joint 15A and the platform 17 through the joint 16A.

All the joints may have two or three degrees of freedom. In order not to obtain inherent stresses in the structure, for each articulated rod at least one end should have a joint with three degrees of freedom.

When the actuators 2 and 3 cause the arms 5A and 6A to pivot relative to each other, the platform 17 will be moved substantially radially outwards/inwards away from/towards the column 1B and when the actuators 2 and 3 are run synchronously in the same direction, the arms 5A and 6A will pivot in the same direction with a constant mutual angle and the platform 17 will be pivoted along a circular orbit with the column 1B in the centre. When the actuator 4 pivots the arm 7A, the platform 17 will be moved substantially upwards/downwards, and all in all a symmetrical toroidal working range around the column 1B is obtained, which may be compared with the working range of a conventional, so-called SCARA robot.

Figure 2A:
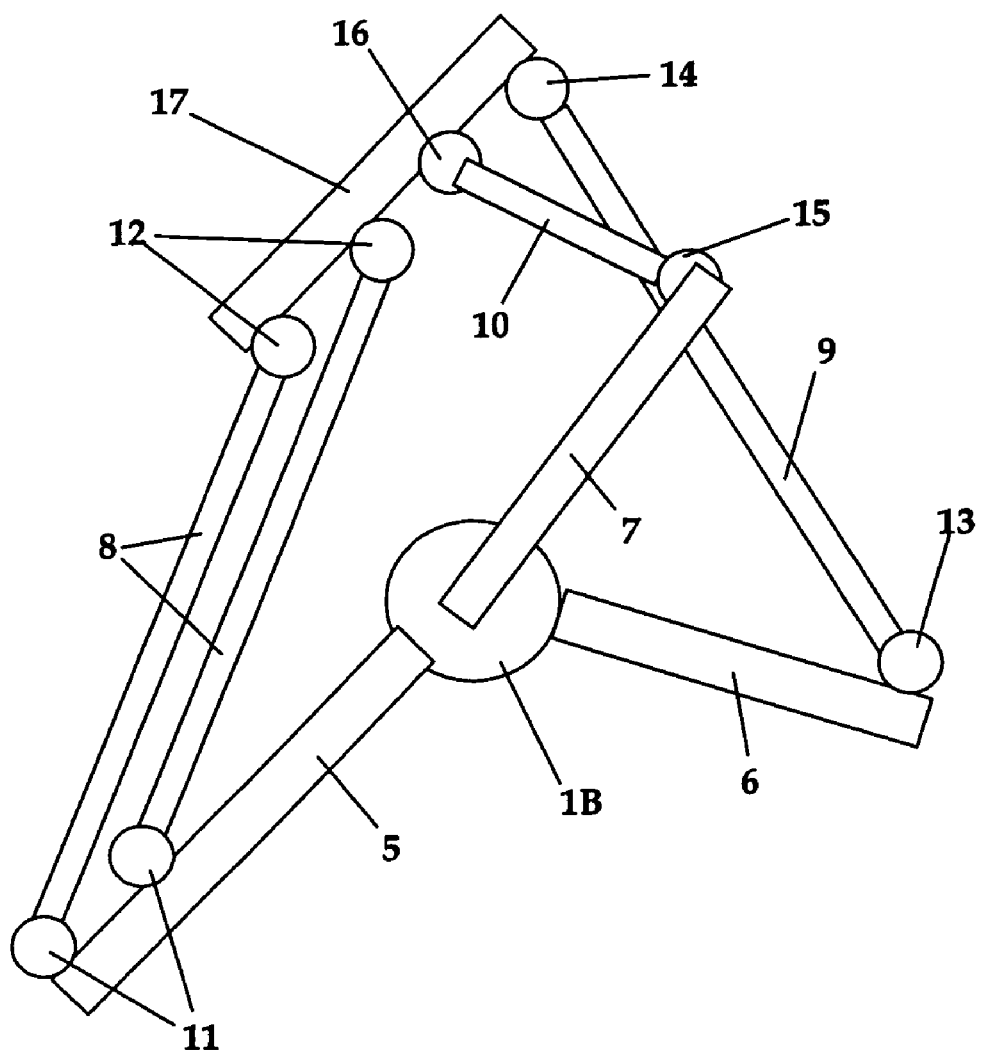
FIGS. 2A and 2B illustrate the kinematic problems that arise when the robot according to FIG. 1 is used.
Figure 2B:
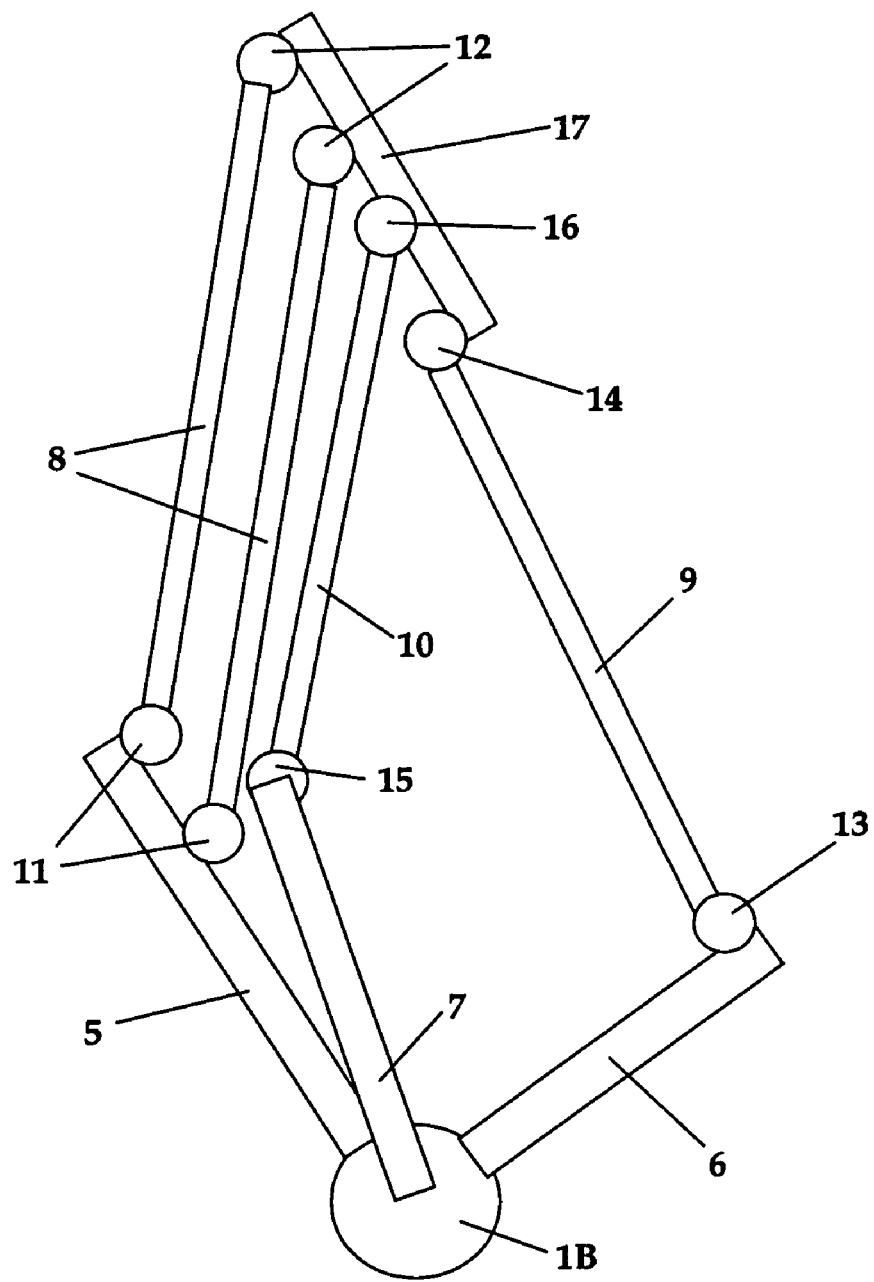

FIG. 2 is a schematic picture of the robot in FIG. 1 seen from above, partly in a position where the platform 17 is near the column 1B (FIG. 2A), and partly where the platform 17 is far away from the column 1B (FIG. 2B). The arm 5 (5A and 5B in FIG. 1) is connected to the platform 17 via the articulated-rod arrangement 8 (8A, 8B, 8C). On the articulated-rod arrangement 8, the joints 11 (11A, 11B and 11C) are positioned at one end and the joints 12 (12A, 12B and 12C) are positioned at the other end. In a corresponding manner, the arm 6 (6A, 6B) is connected to the platform 17 via the joints 13 (13A, 13B), the articulated rods 9 (9A and 9B) and the joints 14 (14A, 14B). Finally, the arm 7 is connected to the platform 17 via the joint 15, the articulated rod 10 and the joint 16.

Because of the parallel articulated rods 8 (8B, 8C), the platform 17 will always be parallel to the arm 5 (5A), and in FIG. 2A, therefore, the platform 17 is angled to the left and in FIG. 2B to the right. Since the actuator 4 (see FIG. 1) is mounted on the arm 6a, the angle between the arm 7 and the arm 6, viewed from above as in FIG. 2A and 2B, will always be constant. This means that the arm 7 in FIG. 2A will be situated nearer the arm 6 that the arm 5 and than the arm 7 in FIG. 2B will be situated nearer the arm 5 than the arm 6. From this follows, in turn, that the working range of the robot cannot be utilized in full and that different oblique loads are imparted to the arm 7 in dependence on where in the working range the platform 17 is situated. To eliminate these problems, a robot structure is required that will ensure that the arm 7 will always be situated midway between the arms 5 and 6.

Figure 3:
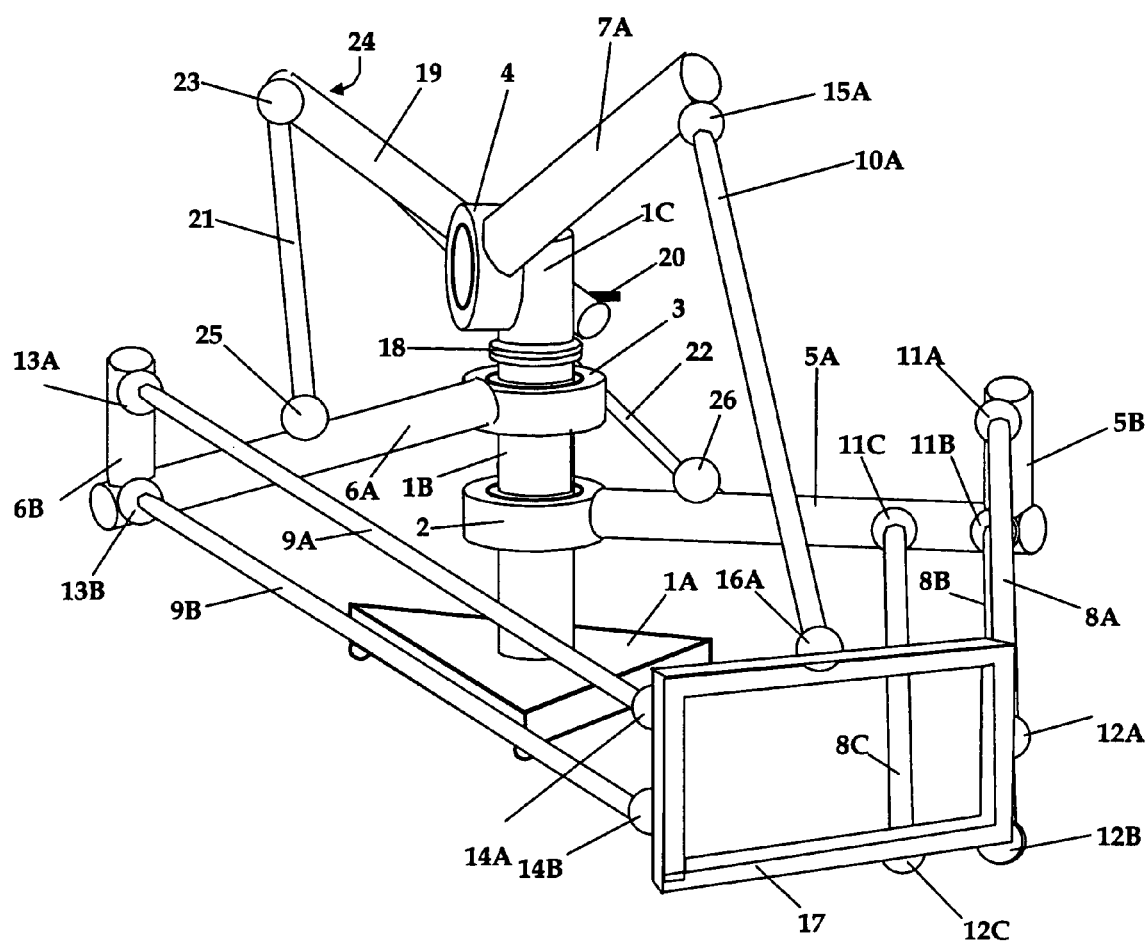
FIG. 3 shows a manipulator according to the invention with a mechanism that centers the central supporting arm of the manipulator between two other supporting arms, thus solving the kinematic problems associated with the embodiment of FIGS. 2A and 2B, FIGS. 4A and 4B show two advantageous embodiments of the manipulator according to the invention.

FIG. 3 shows a mechanism for forcing the arm 7 to always be situated midway between the arms 5 and 6 (viewed in a projection on the horizontal plane). The only difference between the robot in FIG. 3 and in FIG. 1 is that the coupling 1D in FIG. 1 has been replaced by a bearing 18. This bearing enables the element 1C of the central column to rotate freely relative to the element 1B of the central column and the actuators 2 and 3. What is now required is an extra mechanism on the robot that ensures that the arm 7A is always situated midway between the arms 5A and 6A or at least situated in a position with a constant angular ratio between the arms 5A and 6A. The simplest way of doing this is, of course, to install a fourth motor that rotates in the element 1C relative to the element 1B, but this results in a robot which is both more expensive and heavier. Instead, in FIG. 3, an extra articulated-rod mechanism (19–26) has been introduced behind the robot.

A swinging arm 19 is mounted on an axle 20 on the element 1C and is capable of pivoting in a vertical plane behind the robot. At the other end, the pivoting arm 19 is mounted via the joints 23 and 24 (the joint 24 is located behind the arm 19 in FIG. 3) on the articulated rods 21 and 22, respectively. These articulated rods are then mounted on the arms 6A and 5A, respectively, by means of the joints 25 and 26, respectively. When the arms 5A and 6A move relative to each other, the articulated rods 21 and 22 will pivot the arm 19 up/down in a plane determined by the ratio between the articulated rods 21 and 22. Since this ratio is constant, said plane will end up with a constant ratio between the arms 5A and 6A, and the arm 7A will always pivot with this ratio between the arms 5A and 6A. If the ratio is chosen to be 1/1 (links 21 and 22 being of the same length and joints 25 and 26 lying in the same horizontal plane, which they do not in FIG. 3), the arm 7A will always be located midway between the arms 5A and 6A.

The joints 23, 24, 25 and 26 must all have at least two degrees of freedom each. The axle 20 gives the arm 19 one degree of freedom relative to the element 1C.

Figure 4A:
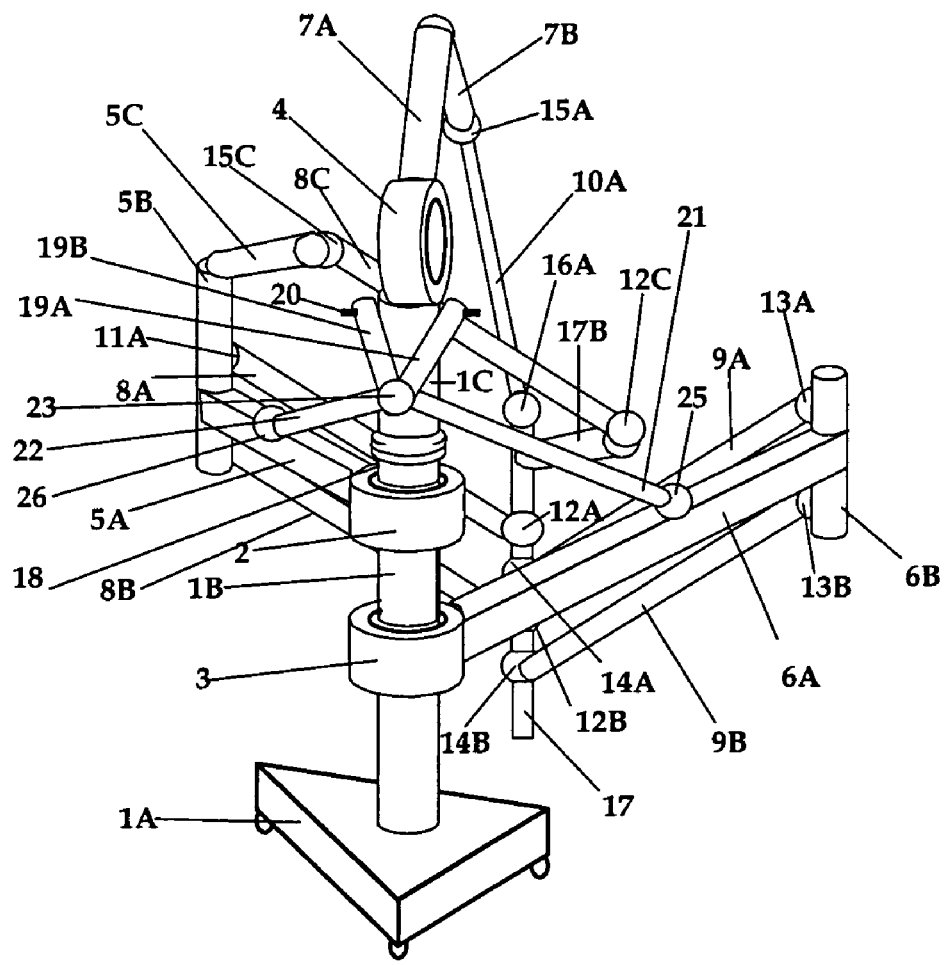

FIG. 4A shows a robot viewed from behind to more clearly illustrate the mechanism for centering the arm 7A. The parallel-kinematic robot itself differs, from the point of view of structure, from the one in FIG. 1 as far as the platform 17 is concerned. The platform in FIG. 4 consists of an axle 17 with a cross-beam 17B. On the axle 17, the joints 16A, 12A, 14A, 12B and 14B are mounted along a common symmetry line. On the cross-beam 17B, the joint 12C is mounted. The joints 12A, 12B and 12C connect the platform 17/17B to the articulated rods 8A, 8B and 8C, respectively, and these articulated rods are then mounted on the arm parts 7B and 8C by means of the joints 15A and 15C, respectively. The arm parts 5B and 5C are secured to the arm 5A, which is driven round by the actuator 2, which in this figure is mounted above the motor 3 on the column 1B. The actuator 3 drives the arm 6A, on which the articulated rods 9A and 9B are mounted via the joints 13A and 13B, respectively. At their other ends, the articulated rods are mounted on the platform axle 17 by way of the joints 14A and 14B, respectively. The actuator 4 is mounted on the element 1C, which is capable of being rotated relative to the column 1B through the bearing 18, which has its axis of rotation coinciding with the axes of rotation of the actuators 2 and 3. The actuator 4 is connected to the platform 17 via the arm 7A, the arm part 7B, the joint 15A, the articulated rod 10A and the joint 16A.

Figure 4B:
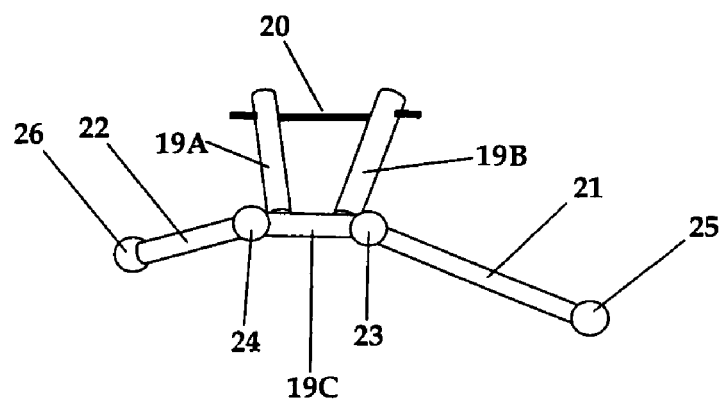

The centring of the arm 7A between the arms 5A and 6A is here carried out with the aid of the mechanism 19–26. This mechanism has been made more rigid than that shown in FIG. 3 by mounting double pivoting arms 19A and 19B on the axle 20 on the platform part 1C. When the arms 5A and 6A are moving relative to each other, the articulated rods 21 and 22 will, via the common joint 23, pivot the arm pair 19A and 19B upwards/downwards around the axle 20. If the articulated rods 21 and 22 are of equal length and if the joints 25 and 26 are mounted in the same horizontal plane, then the arm 7A will be guided to end up midway between the arms 5A and 6A. In FIG. 4B, a variant of the centring mechanism in FIG. 4A is shown. Here, the joint 23 has been replaced by the two joints 23 and 24, which is mounted on a system of pivoting arms that, besides the arms 19A and 19B, consists of a cross-beam 19C. This design provides a somewhat lower rigidity than the design of FIG. 4A but provides a simpler joint design.

For both FIGS. 4A and 4B, the joints 23–26 have at least two degrees of freedom each.

Figure 5:
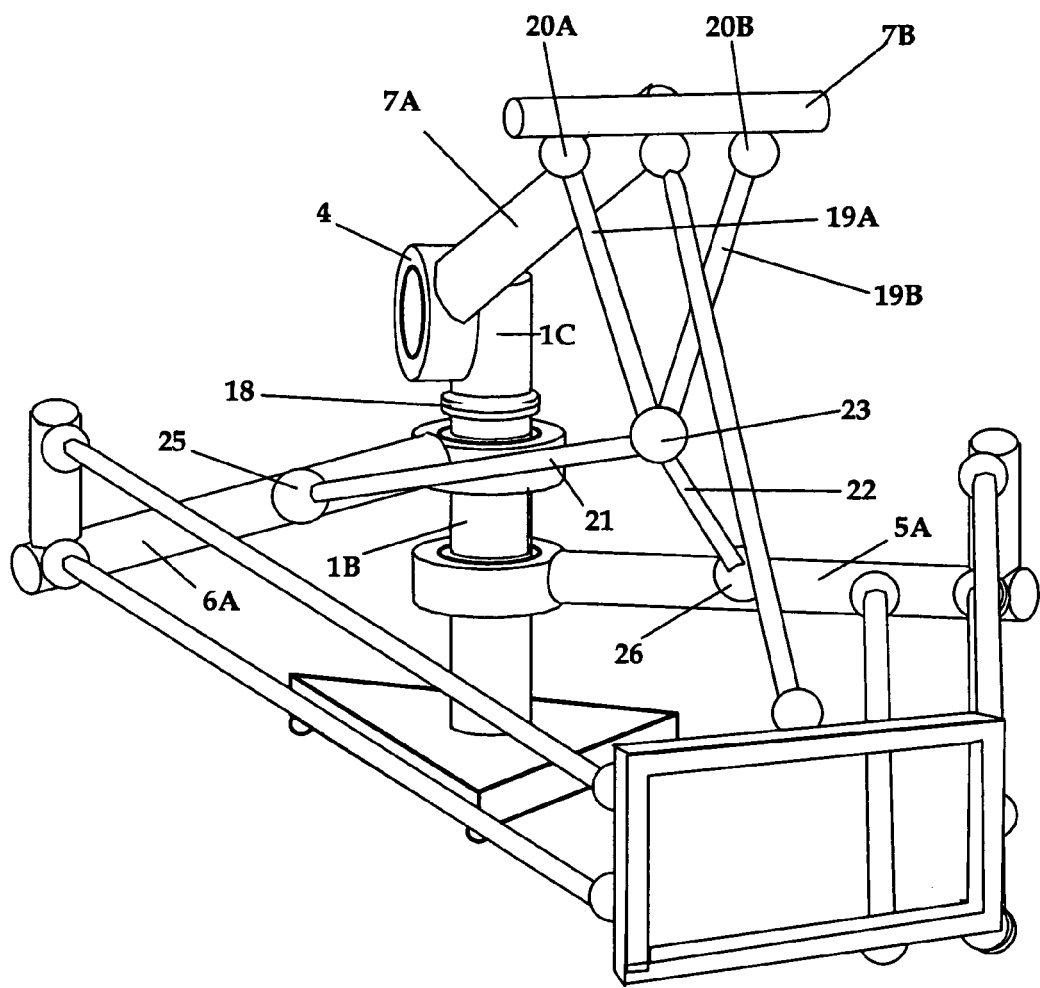
FIG. 5 shows a further advantageous embodiment of the manipulator according to the invention, where the mechanism is placed in front of the centre of the robot.

FIG. 5 shows the same robot as in FIG. 3 but with the mechanism for centring of the arm 7A in front of the column 1B instead of behind as in FIGS. 3 and 4. In the same way as in FIG. 3, the joint 25 is mounted on the arm 6A and the joint 26 on the arm 5A. However, the joints 20A and 20B are now not directly mounted via an axle on the column segment 1C but are now mounted on a cross-beam 7B on the arm 7A. The links 21 and 22 are mounted at one end on the joints 25 and 26, respectively, and at their other ends on the common joint 23. The links 19A and 19B are also mounted on the common joint 23 and at their other ends on the joints 20A and 20B. The common joint 23 may, of course, be divided into two or more joints in the same way as in FIG. 4B. All the joints of this centring mechanism have at least two degrees of freedom.

Figure 6:
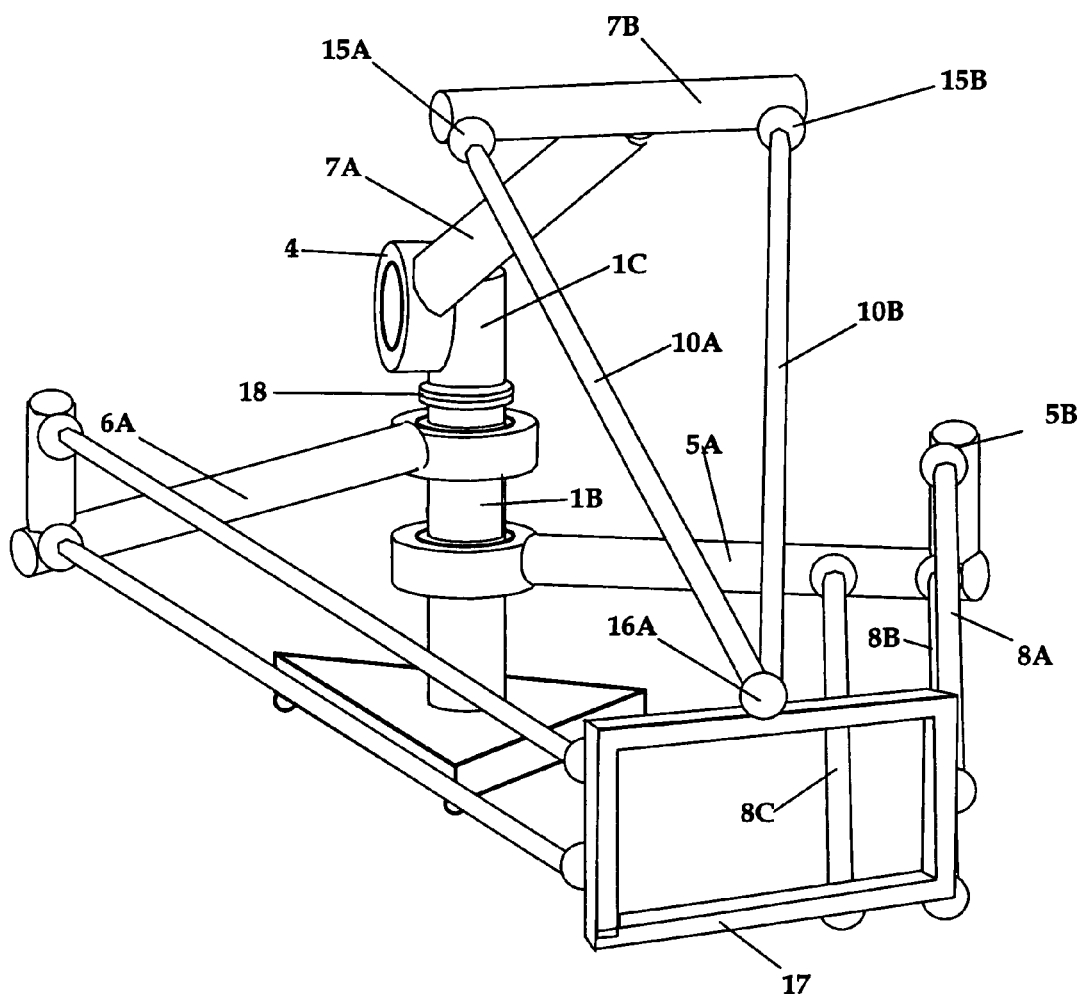
FIG. 6 shows an alternative advantageous embodiment of the manipulator, in which the already existing structure in the manipulator is utilized for forming a triangle.

FIG. 6 shows the same robot as in FIG. 3 but now with a different mechanism for centring the arm 7A between the arms 5A and 6A. This mechanism is based on the fact that the bearing 18 introduces another degree of freedom of the assembled robot structure and that this provides a possibility, by redundant locking of degrees of freedom of the platform 17, of locking the new degree of freedom arisen through the bearing 18 between the column 1B and the element 1C. In the figure, the redundant locking is performed with the aid of the seventh articulated rod 10B. This articulated rod is, at one end, mounted via the joint 16A on the platform 17 and, at its other end, via the joint 15B on the cross-beam 7B, which is secured to the arm 7A. In the figure, the articulated rod 10B shares the same joint with the articulated rod 10A, which is necessary for the platform 17 to be able to rotate around a vertical axis of rotation since it is to be maintained parallel to the arm 5A through the articulated rods 8B and 8C. At its upper end the articulated rod 10A is mounted by means of the joint 15A in the cross-beam 7B. The joints 15A and 15B may have one, two or three degrees of freedom and the joint 16A must have at least two degrees of freedom. In the case where the joints 15A and 15B have only one degree of freedom, the axes of rotation of these must be coinciding. It is to be preferred that all the joints (15A, 15B and 16A) have three degrees of freedom to prevent mechanical stresses from building up in the articulated rods and the joints.

Figure 7:
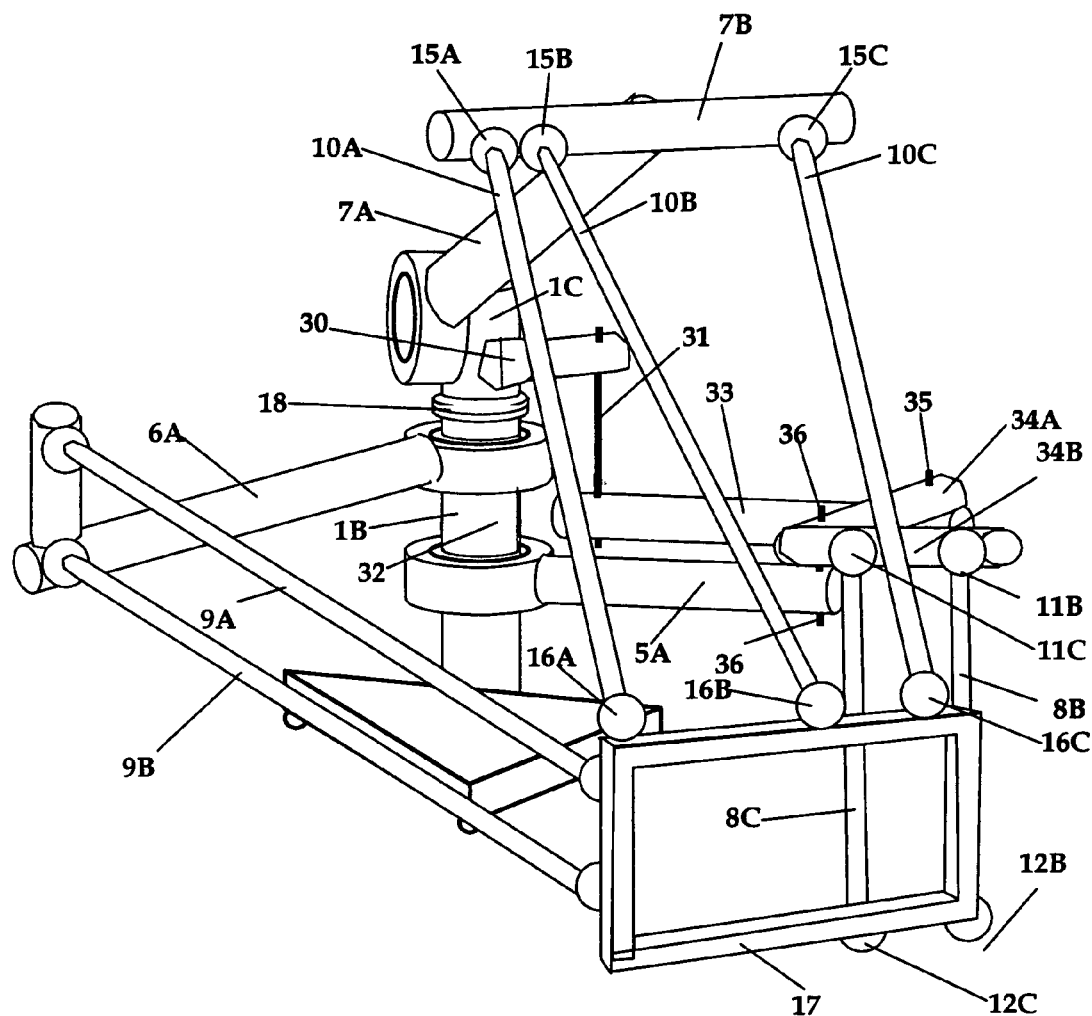
FIG. 7 shows an additional advantageous embodiment of a manipulator according to the invention, wherein the centring mechanism comprises a locked double link formed from links in combination with existing links, whereby the normal to the platform manipulated by the robot will always be directed radially outwards from the centre of the robot.

FIG. 7 shows a variant of the robot in FIG. 6. In the same way as in FIG. 6, seven articulated rods are used between the three arms (5A, 6A and 7A) of the robot and the platform 17, but now a different distribution of articulated rods between the arms has been made. Thus, the arms 5A and 6A are connected to the platform 17 through two articulated rods each (8B, 8C and 9A, 9B, respectively). To obtain a total of seven articulated rods between the platform and the arm system, the arm 7A must now be connected to the platform 17 by three articulated rods. In order that all the six degrees of freedom of the platform plus the degree of freedom due to the bearing 18 shall now be locked, a maximum of two of these three articulated rods (10A, 10B, 10C) must be parallel. Thus, in FIG. 7 the articulated rods 10A and 10C are parallel whereas the articulated rod 10B is diagonally mounted between the articulated rods 10A and 10C. The three articulated rods 10A, 10B and 10C will require that a line through the joints 16A–16C be parallel to a line through the joints 15A–15C, and for this to be possible, the arm 5A has been provided with a parallelogram mechanism. This mechanism adjusts the beam 34B such that this is always parallel to the beam 7B, whereby the platform 17 will no longer follow the orientation of the arm 5A but will always have the same constant orientation relative to the arm 7A that is centred midway between the arms 5A and 6A. The parallelogram mechanism comprises the arm 30, which is secured to the element 1C, the free flexible axle 31, the parallelogram arm 33 that is parallel to the arm 5A, the free flexible axles 35 and 36, and the L-formed beam 34A–34B. When the arm 5A is rotated relative to the element 1C, the beam part 34B of the L-formed beam 34A–34B will be pivoted by the parallelogram arm 33 such that the beam part 34A is maintained parallel to the beam 30 that is secured to the column element 1C, which, with a suitable choice of the angle between the beam parts 34A and 34B, means that the beam part 34B is maintained parallel to the beam 7B. It should be mentioned that the perspective drawing in the figure is not satisfactory, but in the figure a line through the joints 11B and 11C shall be parallel to a line through the joints 12B and 12C and parallel to a line through the joints 16A, 16B and 16C as well as parallel to a line through the joints 15A, 15B and 15C. It should also be pointed out that the mechanics between the beam 30 and the parallelogram arm 33 is only schematically drawn. There should actually be a frame structure here in order to obtain a rigid joint around the axle 31.

Figure 8:
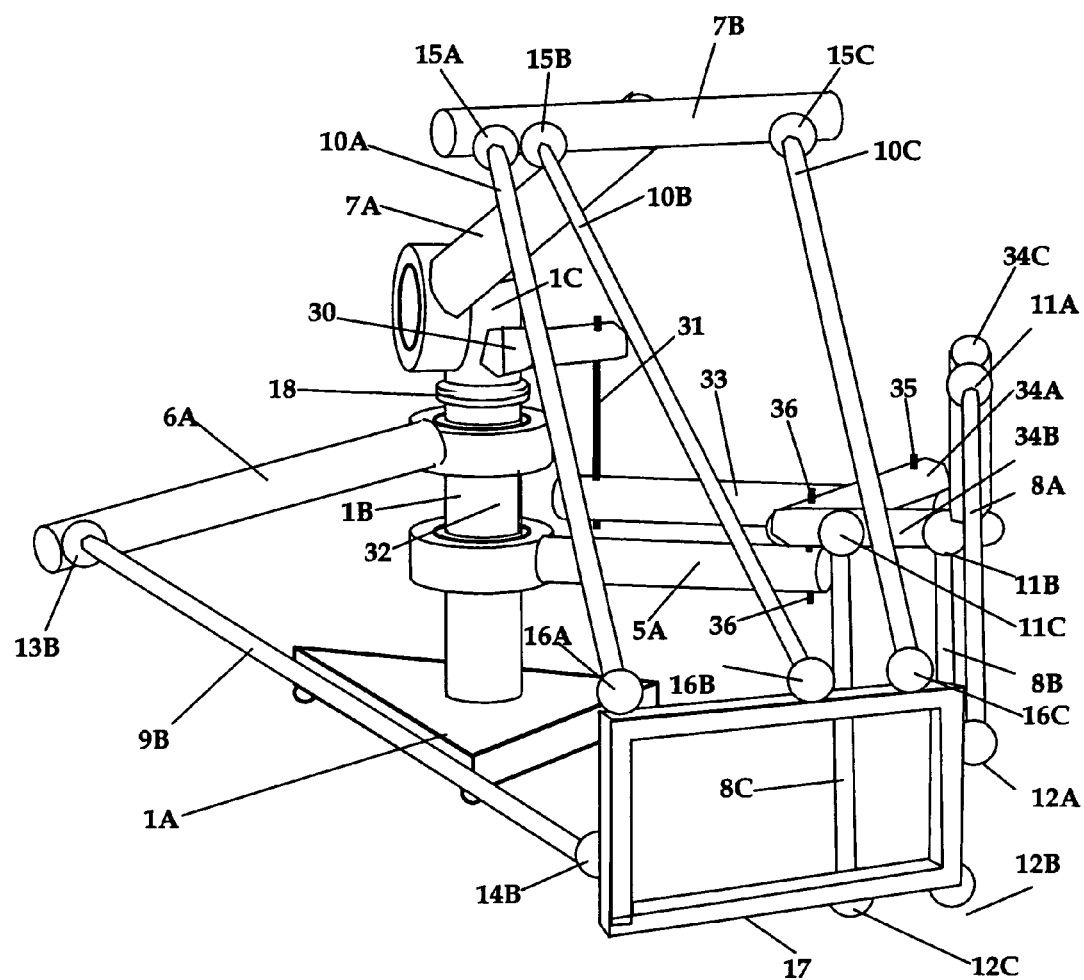
FIG. 8 shows an advantageous embodiment of the manipulator according to FIG. 7.

FIG. 8, finally, shows a variant of the structure in FIG. 7. With the introduction of the bearing 18, articulated rods are required between the arm system and the platform 17. In FIG. 7, these articulated rods are distributed among the arms 5A, 6A and 7A as 2/2/3. However, there are also other functioning distributions, as, for example, 3/2/2 and 3/1/3. The case of 3/1/3 is shown in FIG. 8. The only thing that has been added here relative to FIG. 7 is that the beam angle 34A–34B has been supplemented with the vertical beam 34C, on which the articulated rod 8A has been mounted and that the articulated rod 9A has been removed. In the case of 3/2/2, the articulated rod 8A according to FIG. 8 and the link 9A according to FIG. 7 are used whereas the link 10C is suitably removed from the arm 7A.

The joints 15A, 15B, 15C, 16A, 16B and 16C in both FIG. 7 and FIG. 8 may have either one, two or three degrees of freedom. In the case of one degree of freedom, the axes of rotation of the joints 15A, 15B and 15C shall coincide, and likewise the axes of rotation of the joints 16A, 16B and 16C shall coincide.

The articulated rods 8A, 8B, 8C, 9A, 9B, 10A, 10B are mounted on the platform 17 by means of the joints 12A, 12B, 12C, 14A, 14B, 14C, 16A. In a corresponding manner, the articulated rods 8A, 8B, 8C, 9A, 9B, 10A, 10B are mounted by means of joints 11A, 11B, 11C, 13A, 13B, 15A, 15B on the three pivoting arms 5A, 6A, 7A in order to form kinematic chains. Thus, a first kinematic chain is obtained consisting of a first element 1C, on which the third pivoting arm 7A is mounted, the third pivoting arm itself 7A and the articulated rods 10A, 10B connected to the third pivoting arm 7A. A second kinematic chain is defined by a second element 1B, on which the first two pivoting arms 5A, 6A are mounted, one 5A of the first two pivoting arms 5A, 6A, the articulating rods 8A, 8B, 8C connected to said one 5A of the first two pivoting arms, the manipulated platform 17, the articulated rods 9A, 9B connected to the other 6A of the said first two pivoting arms mounted on said element 1B, and the other 6A of said first two pivoting arms 5A, 6A.

The articulated rods mounted on the same pivoting arm are mounted, in those cases where there are more than one, parallel to one another and are made with equal lengths. The joints 11A, 11B, 11C, 12A, 12B, 12C, 13A, 13B, 14A, 14B of the articulated rods 8A, 8B, 8C, 9A, 9B that are included in the second kinematic chain have two or three degrees of freedom whereas the joints 15A, 15B, 15C, 16A, 16B, 16C of the articulated rods 10A, 10B, 10C that are included in the first kinematic chain may also have one degree of freedom.

To obtain a robot with a large working range and with good dynamic properties, the axes of rotation, around which the above-mentioned first two pivoting arms 5A, 6A are pivoting, must not be perpendicular to each other and the best performance is obtained if these axes of rotation are parallel and preferably coinciding. For the third pivoting arm 7A, its axis of rotation must not be parallel to any of the axes of rotation of the first two pivoting arms 5A, 6A, and the best performance is obtained if the axis of rotation of the third pivoting arm 7A is perpendicular to the axes of rotation of both of the first two pivoting arms 5A, 6A.

The invention comprises a robot in which the abovementioned first element 1C is connected to the abovementioned second element 1B via a bearing 18 such that the first element 1C may be freely rotated relative to the second element 1B. This implies that the third pivoting arm 7A, which is mounted via a joint or a rotating actuator 4 on the first element 1C, may pivot in different directions relative to the second element 1B. With the introduction of said bearing 18, an extra degree of freedom has been introduced between said first kinematic chain and said second kinematic chain, which may be utilized for guiding the first kinematic chain such that a favourable position of the components thereof 1C, 4, 7A, 7B, 15A, 10A is obtained relative to the components 5A, 5B, 5C, 11A, 11B, 11C, 8A, 8B, 8C, 12A, 12B, 12C, 17, 17A, 14A, 14B, 9A, 9B, 13A, 13B, 6A, 6B in the second kinematic chain when said platform 17 is manipulated by the robot in its working range.

The inventive concept comprises guiding the abovementioned kinematic chains relative to each other by introducing a bridge between these kinematic chains. This bridge comprises one or more extra articulated rods 10B, 10C, 21, 22 connected to joints 15B, 16A, 15C, 16C, 23, 24, 25, 26 directly or via pivoting arms 19, 19A, 19B and/or other extra articulated rods 19A, 19B. Since said kinematic chains are separated by the previously mentioned bearing 18, said bridge will lock the degree of freedom of rotation provided by said bearing 18.

The inventive concept also comprises mounting said bearing 18 such that its axis of rotation is not perpendicular to the axes of rotation of said first two pivoting arms 5A, 6A and not parallel to the axis of rotation of said third pivoting arm 7A. To obtain the largest possible working range and optimum dynamic properties of the robot, said bearing 18 is mounted such that its axis of rotation becomes parallel to and preferably coinciding with the axes of rotation of said first two pivoting arms 5A, 6A and at the same time perpendicular to the axis of rotation of said third pivoting arm 7A.

The inventive concept also comprises mounting an extra articulated rod 10B between the manipulated platform 17 and the third pivoting arm 7A to obtain said bridge that is to lock the degree of freedom of rotation provided by said bearing 18. This extra articulated rod is mounted at an angle relative to the already existing articulated rod 10A between the platform 17 and the third pivoting arm 7A. At one end the extra articulated rod 10B is mounted on the platform 17 by a common joint 16A with the already existing articulated rod 10A and at its other end the extra articulated rod 10B is mounted on a beam 7B some distance away from the existing articulated rod 10A. The beam 7B is secured to the third pivoting arm 7A and is mounted so as not to become parallel to the third pivoting arm 7A but preferably perpendicular thereto. In that way, a movement of the platform 17 in the lateral direction will force the third pivoting arm and the first element 1C to rotate on said bearing 18 and thus to accompany the movement of the platform in the lateral direction, which, in turn, means that the third pivoting arm will be situated in the centre of the working range between the first two pivoting arms 5A, 6A. The extra articulated rod 10B and the existing articulated rod 10A must have a common joint 16A towards the platform 17 to allow this to rotate when being manipulated in the radial direction relative to the center of the robot.

The inventive concept also comprises using a kinematic bridge that does not need a common joint 16A towards the platform 17. To this end, a parallelogram mechanism 30, 31, 33, 35, 34A, 36 is introduced in one of the first two pivoting arms. By connecting this parallelogram mechanism between the first element 1C and the articulated rods 8A, 8B, 8C belonging to the current one 5A of the first two pivoting arms, the platform 17 will always be capable of being maintained parallel to a cross-beam 7B to the third pivoting arm 7A. This makes it possible to use two or more articulated rods between the manipulated platform 17 and the cross-beam 7B to the third pivoting arm 7A without a common joint being required at the platform 17. For example, when using two articulated rods when connecting the third pivoting arm 7A to the platform 17, a triangular configuration of the articulated rods, with its base on the platform 17, may be used. Further, when two articulated rods are used, a parallelepipedic configuration may be used. When two articulated rods are used between the third pivoting arm 7A and the platform 17, the first two pivoting arms 5A, 6A will need together five articulated rods to the platform 17, in which case the distribution between the pivoting arms is three for one of the pivoting arms and two for the other. If instead three articulated rods 10A, 10B, 10C are mounted between the cross-beam 7B of the third pivoting arm 7A and the platform 17, only four articulated rods altogether will be required for the first two pivoting arms 5A, 6A, and these may then be distributed in two different ways, either two articulated rods each for the first two pivoting arms 5A, 6A or three articulated rods for one and one articulated rod for the other of the first two pivoting arms. When three articulated rods are used between the third pivoting arm and the platform, all the three articulated rods may not be mounted in parallel but at least one articulated 10B must be mounted at an angle relative to the other articulated rods 10A, 10C. In fact, none of these articulated rods 10A, 10B, 10C need to be parallel. On the other hand, all the joints 16A, 16B, 16C of the articulated rods towards the platform must be situated along a line that is parallel to a line through the joints 15A, 15B, 15C of the articulated rods towards said cross-beam 7B. These lines should, in addition, be parallel to the axis of rotation of the third pivoting arm 7A. It should be pointed out that the joints 15A, 15B, 15C, 16A, 16B, 16C may have one, two or three degrees of freedom, and in the case of one degree of freedom all the joints at the same end of the articulated rods shall have coinciding axes of rotation. Preferable is to have three degrees of freedom at one end of the articulated rods and two or three degrees of freedom at the other end of the articulated rods in order not to build mechanical stresses into the articulated rods and the rest of the robot structure. For an optimum design, there should be no redundancy as far as locking of degrees of freedom in the previously mentioned kinematic chains is concerned.

The inventive concept comprises supplementing the extra articulated rods 21, 22 by extra pivoting arms 19, 19A, 19B and/or additional extra articulated rods 19A, 19B. The pivoting arms and the additional extra articulated rods are connected either to the above-mentioned first element 1C or to the third pivoting arm 7A. The extra pivoting arm 19 is suitably mounted on the other element 1C via a joint with one degree of freedom so that the axis of rotation of the extra pivoting arm 19 is essentially parallel to the axis of rotation of the third pivoting arm 7A. The additional extra articulated rods 19A, 19B are mounted on a cross-beam, either on the third pivoting arm 7A or on the second element 1C. One 21 of the extra articulated rods 21, 22 is mounted at one end via a joint 25 with two degrees of freedom on one 6A of the first two pivoting arms and at its other end via a joint 23 with two degrees of freedom on said pivoting arms and/or additional articulated rods. The other 22 of the extra articulated rods 21, 22 is mounted at one end via a joint 26 with two degrees of freedom on the other 5A of the first two pivoting arms and at its other end via a joint 24 with two degrees of freedom on said pivoting arms and/or additional articulated rods. In this way, said first kinematic chain is connected to said second kinematic chain and the extra degree of freedom through said bearing 18 is locked. This locking may easily be made such that the third pivoting arm 7A will always be situated midway between the first two pivoting arms 5A, 6A.

What is claimed is:

1. An industrial robot for movement of an object in space comprising a stationary platform, a movable platform adapted for supporting the object, and a first, a second and a third arm to which the platforms are joined, the first arm comprising a first actuator, a first supporting arm influenced by the first actuator and rotatable around a first axis, and a first linkage, the second arm comprising a second actuator, a second supporting arm influenced by the second actuator and rotatable around a second axis, and a second linkage, and the third arm comprising a third actuator, a third supporting arm influenced by the third actuator and rotatable around a third axis, and a third linkage, wherein the stationary platform comprises a bearing allowing the third supporting arm to freely rotate around a fourth axis that is arranged in a plane normal to the third axis.

2. The industrial robot according to claim 1, wherein the third supporting arm comprises a linkage that influences the third supporting arm to rotate in a plane intersecting the movable platform.

3. The industrial robot according to claim 1, wherein the third supporting arm comprises a fourth supporting arm, the outer end of which is connected, by means of a first link, to the first supporting arm and is connected, by means of a second link, to the second supporting arm.

4. The industrial robot according to claim 3, wherein the fourth supporting arm comprises a triangle, the base of which is journalled to the third supporting arm.

5. The industrial robot according to claim 1, wherein the third linkage comprises a triangle, the base of which is journalled in the third supporting arm and the top of which is journalled in the movable platform.

6. The industrial robot according to claim 1, wherein the first linkage comprises a triple link and that the second linkage comprises a double link.

7. The industrial robot according to claim 1, wherein the third linkage comprises a locked double link that joins the third supporting arm to the movable platform.

8. The industrial robot according to claim 7, wherein the first linkage comprises a double link and that the second linkage comprises a double link.

9. The industrial robot according to claim 7, wherein the first linkage comprises a triple link and that the second linkage comprises one link.

10. The industrial robot according to claim 1, wherein the first and second axes are coincident.

11. A method for manufacturing an industrial robot, with which an object is moved in space, the comprising:

operatively supporting the object with a movable platform;

operatively connecting a first arm and a third arm to the movable platform;

operatively connecting the first arm to a first actuator;

operatively connecting a first supporting arm rotatable around a first axis to the first actuator;

operatively connecting a first linkage to the first arm and to the movable platform;

operatively connecting the second arm to a second actuator;

operatively connecting a second supporting arm rotatable around a second axis to the second actuator;

operatively connecting a second linkage to the first arm and to the movable platform;

operatively connecting a third actuator to the third arm;

operatively connecting a third supporting arm rotatable around a third axis to the third actuator;

operatively connecting a third linkage to the third arm and to the movable platform; and providing the movable platform with a bearing operative to permit the second supporting arm to freely rotate around a fourth axis that is arranged in a plane normal to the third axis.

12. The method according to claim 11 further comprising: arranging the third supporting arm such that it can rotate in a plane intersecting the movable platform.

13. The method according to claim 11 further comprising:

providing the third supporting arm with a fourth supporting arm;

connecting an outer end of the fourth supporting arm by means of a first link to the first supporting arm and by means of a second link to the third supporting arm.

14. A method for carrying out laser cutting, the method comprising:

providing a robot including a stationary platform, a movable platform adapted for supporting the object, and a first, a second and a third arm to which the platforms are joined, the first arm comprising a first actuator, a first supporting arm influenced by the first actuator and rotatable around a first axis, and a first linkage, the second arm comprising a second actuator, a second supporting arm influenced by the second actuator and rotatable around a second axis, and a second linkage, and the third arm comprising a third actuator, a third supporting arm influenced by the third actuator and rotatable around a third axis, and a third linkage, wherein the stationary platform comprises a bearing allowing the third supporting arm to freely rotate around a fourth axis that is arranged in a plane normal to the third axis; and carrying out laser cutting with the robot.

* * * * *